Figure 4:
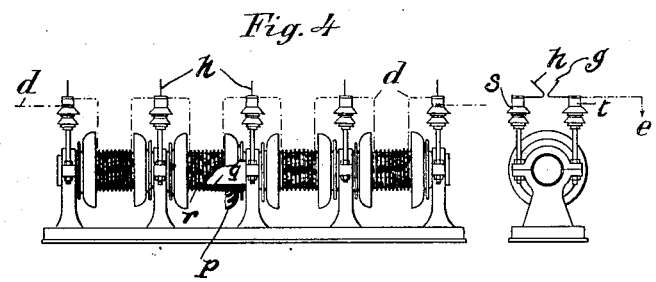

C. FERRARI & M. PIZZUTI.
APPARATUS FOR SHORTENING ELECTRIC WAVES.
APPLICATION FILED APR. 14, 1910.
1,000,248.
Patented Aug. 8, 1911.
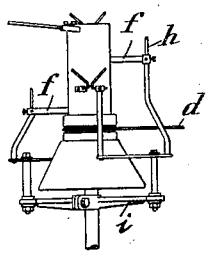
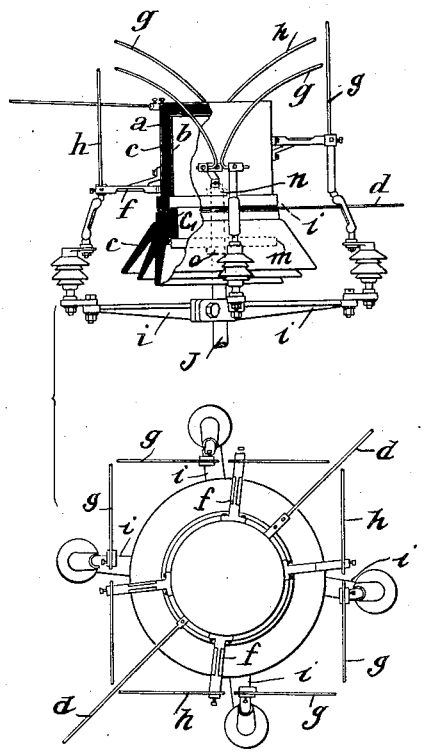
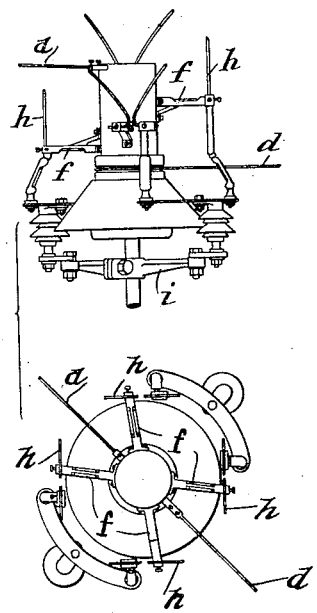
Inventors
Carlo Ferrari
Michele Pizzuti C. FERRARI & M. PIZZUTI.
APPARATUS FOR SHORTENING ELECTRIC WAVES.
APPLICATION FILED APR. 14, 1910.

1,000,248.

Patented Aug. 8, 1911.

2 SHEETS—SHEET 2.

UNITED STATES PATENT OFFICE.

CARLO FERRARI AND MICHELE PIZZUTI, OF NAPLES, ITALY.

APPARATUS FOR SHORTENING ELECTRIC WAVES.

1,000,248.  Specification of Letters Patent.  Patented Aug. 8, 1911.

Application filed April 14, 1910. Serial No. 555,497.

*To all whom it may concern:*

Be it known that we, CARLO FERRARI and MICHELE PIZZUTI, residing at Naples, Italy, have invented certain new and useful Improved Apparatus for Shortening Electric Waves, of which the following is a specification.

This invention relates to an improved apparatus for protecting electric installations from excessive accidental voltages arising from any cause.

It is known for instance that atmospheric discharges which are generally of an oscillatory nature, produce by electrostatic and electromagnetic induction, oscillatory currents of high frequency and voltage in electrical conductors, which currents are propagated by waves. Whether these disturbances are ordinarily induced equally over all the conductors of one and the same circuit, or by the reflections at the points where the reactances and the capacities are concentrated, it is certain that they can produce stationary waves especially if the conditions of resonance of the whole or part of the circuit are satisfactory. It is these stationary waves which are the most dangerous for electrical installations because they allow of the greatest amplitudes of the potentials. They have also the greatest duration, and they render the working of the dischargers uncertain. The greatest difficulties in the way of protection are as is well known, due to the fact that whatever the nature of the discharger placed in the circuit, it will be ineffective if in its neighborhood there should occur a node of the stationary wave of the potentials. In practice, a greater protection of the installation is obtained by increasing the number of dischargers included in the line, or in a lightning-arrester which is combined or not with various self-inductions. Now, since according to the theory stationary waves of high frequency occurring in conductors, are the shorter the greater the capacity and self-induction of the line, if there be inserted in series with the conductor, an apparatus of short length for which the product of the inductance and capacity per unit of length is much greater than the product of the inductance and capacity of the line per unit per length, then any wave on the conductor will become reduced in length even to the length of the apparatus, and further, if the relation between the constants of the conductor and that of the apparatus are maintained constant, the stationary wave will not become substantially modified by being shortened.

The present applicants have discovered that the successive nodes of a stationary wave divide the conductor into sections for which the product of the inductance and the capacity has the same value. To the square-root of the product of the self-induction and capacity of the apparatus, viz., $$\sqrt{L.Ca,}$$

there may be given the value that corresponds to the entire length of a stationary wave. In this case the values of the potentials corresponding to one wave will appear along the outer surface of the said apparatus. If now the apparatus be provided with multiple discharge gaps along the whole of its surface that is traversed by the line current, the regular operation of the apparatus will be insured, because all the values of the potentials of the wave will be obtained on the surface of the apparatus, and consequently the respective discharge gaps will be found to correspond necessarily with the maximum potentials of the wave. This is equivalent to the installation of a very large number of discharge gaps over the equivalent length of the line, and the objection above referred to that the discharge gap will remain ineffective if a node of the stationary wave of the potentials occurs in its neighborhood, will thereby be overcome.

By calculation it will be found that with capacities constituted solely by masses of metal, the object of the invention will not be attained, unless the dimensions are enormous, and therefore it is necessary to have recourse to true capacities formed by two armatures separated by a dielectric.

On the outside of the condenser there are provided multiple discharge gaps arranged in pairs opposite one another. One half of these are connected to the outer armature, and the other half which are carried by insulating supports may be connected to earth through the intermediary of suitable resistances. The self-induction device is likewise furnished with discharge gaps.

According to one form of construction the apparatus comprises a self-induction coil formed of various elements wound on a dielectric whose inner surface is covered by a metal armature, several pairs of discharge gaps being provided along the outer metallic winding and the inner armature being connected to earth.

The accompanying drawings illustrate by way of example five typical constructions of apparatus according to this invention.

Figure 5:
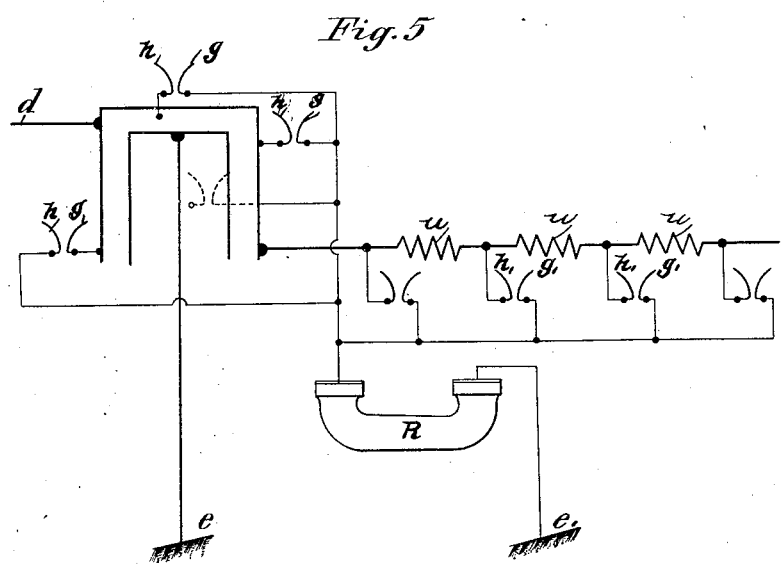

Figure 1 is an elevation of the type of the improved apparatus suitable for installations in which the normal potential may rise to 1,000 volts. Fig. 2 shows in elevation and in plan the type of the improved apparatus suitable for installations working up to 10,000 volts. Fig. 3 shows in sectional elevation and in plan the type of the improved apparatus suitable for installations working up to 80,000 volts. Fig. 4 shows in side elevation partly in section and in end elevation, the type of the improved apparatus in which the capacity and the self-induction device are contained in one and the same apparatus, and Fig. 5 is a diagrammatic view of the general scheme of connections.

Referring more particularly to Fig. 3 the improved apparatus is composed of two metal envelops $a$ and $b$ separated from each other by a partition of porcelain $c$ which acts also as an insulator for the line $d$. The whole forms a bell-shaped condenser the outer lining of which is connected to the line and the inner lining to earth. The apparatus further comprises four pairs of discharge gaps of the horn type arranged along a helical line around the condenser in the manner shown, each pair of discharging wings having one of its wings, viz., the discharging point $h$ carried by a foot arranged on the outer lining and the other wing, viz., the discharging point $g$ supported by a radial arm $i$ which is carried by the iron support $j$ and is connected to the inner lining through said support and through a metallic connection (not shown) between the latter and the inner lining of the condenser, the support $j$ being connected also to earth.

The condenser formed by the metal envelops $a$ and $b$ and by the insulator $c$ is mounted on the support $j$ and fixed thereto through the intermediary of a double bayonet joint formed on the one hand by an inner projection or flange $c_1$ on the insulator $c$ which flange extends for about half the periphery of the insulator, and on the other hand by two sector shaped metal plates $l$ and $m$ which are screw-threaded on to the support $j$ and which when brought into engagement with the flange $c_1$ are kept in rigid connection therewith by means of two nuts $n$ and $o$.

Referring to the apparatus illustrated in Fig. 4, the same consists of a tubular member of insulating material (porcelain or glass) formed with bell-shaped projections $p$ and provided with an inner metal lining $q$ which is electrically connected with the metallic support of the apparatus, (the support itself being in its turn connected to earth,) and with an outer metal winding $r$ forming part of the line. A certain number of such combined elements (in the drawing four) of self-induction and capacity are inserted between the line and the installation to be protected and are connected in series with one another, the connection between two adjacent windings $r$ being carried over an insulator $s$ provided with a metallic cap having attached thereto a discharge wing $h$. Opposite each wing $h$ there is provided a wing $g$ attached to a metallic cap which is mounted on an insulator $t$ and is connected to earth $e$ directly or through the intermediary of a resistance (not shown) according to the tension of the line.

Referring now to Fig. 5 which is a diagrammatic illustration of the electrical connections when the apparatus shown in Figs. 1 to 3 are used, $d$ represents the line, which is connected to the outer armature of the condenser, $e$ the earth connection leading from the inner armature of the condenser, $h\ g$ the discharging wings described in connection with Fig. 3, $u$ inductive coils arranged in series with one another and with the condenser, $h_1$ discharge wings metallically connected to the connections between said resistances, and $q_1$ discharge wings connected to earth $e_1$ directly or through the intermediary of a resistance R according to the tension of the line.

The present applicants have obtained results which have clearly proved the efficiency of this invention, the improved apparatus having operated in an effective manner to discharge excessive potentials produced by the phenomena of resonance arising from various causes.

Having now fully described our said invention, and the manner in which the same is to be performed, what we claim and desire to secure by Letters Patent of the United States is:

1. An improved apparatus for protecting electric installation from excessive accidental voltages comprising in combination a self-induction, a capacity, and discharge gaps, the self-induction and one armature of said capacity being arranged in series with and between a line and an installation to be protected, the other armature of the capacity being connected to earth, and the discharge gaps being connected on the one side to different points on the self-induction and armature which is in series with the line and on the other side to earth, while the product of said self-induction and capacity per unit of length is greater than the product of the self-induction and capacity of the line per unit of length, as and for the purposes set forth.

2. An improved apparatus for protecting electric installations from excessive accidental voltages comprising in combination a combined self-induction and capacity consisting of a tubular insulator provided with an inner metal lining connected to earth and with an outer metal winding arranged in series with and between a line and an installation to be protected, and discharge gaps connected on the one side to different points of said outer winding and on the other side to earth, the product of the self-induction of the winding and of the capacity formed by the latter with the inner metal lining being greater, per unit of length, than the product of the self-induction and capacity of the line per unit of length, as and for the purposes set forth.

In testimony whereof we have signed our names to this specification in the presence of two subscribing witnesses.

CARLO FERRARI.
    MICHELE PIZZUTI.

Witnesses:
 ALFONSO MANCINI,
 NICOLA GUORINI.